March 11, 1930.  R. T. TODD  1,750,442
ELECTRICAL WELDING MACHINE
Filed June 9, 1928    5 Sheets-Sheet 5

Inventor
RUSSELL T. TODD
By Fisher, Moser & Moore
Attorney

Patented Mar. 11, 1930

1,750,442

UNITED STATES PATENT OFFICE

RUSSELL T. TODD, OF WARREN, OHIO, ASSIGNOR TO THE TAYLOR-WINFIELD CORPORATION, A CORPORATION

ELECTRICAL WELDING MACHINE

Application filed June 9, 1928. Serial No. 284,033.

This invention relates to an improvement in electrical welding machines of the type and kind shown and described in the Letters Patent of the United States, granted to A. C. Taylor, Jan. 3, 1928, No. 1,654,563. To comprehend the nature of this improvement it should be first understood that in operating such machines two thin sheets of metal are clamped edge to edge preliminary to welding them together. The metal sheets are either flat, curved or of irregular contour or shape, and of such large size that welding operations frequently involve edge portions many feet in length. Welding of these long edge portions is effected automatically and simultaneously the full length thereof, and to obtain satisfactory results the respective edge portions must be clamped tightly and with uniform pressure their entire length. The clamping means include separate sets of clamping dies corresponding to the contour or shape of the sheets, and the welding current passes through these dies to the sheets. To distribute the welding current effectively to two relatively large sheets demands a heavy pressure applied uniformly the full length of the borders of the sheets. The present improvement consists more particularly in the new and novel means for operating the clamping dies, whereby a heavy pressure may be applied quickly and uniformly the entire length of both edges of the sheets to be welded together, all as hereinafter described in greater detail and also more concisely set forth in the claims.

Figure 1:
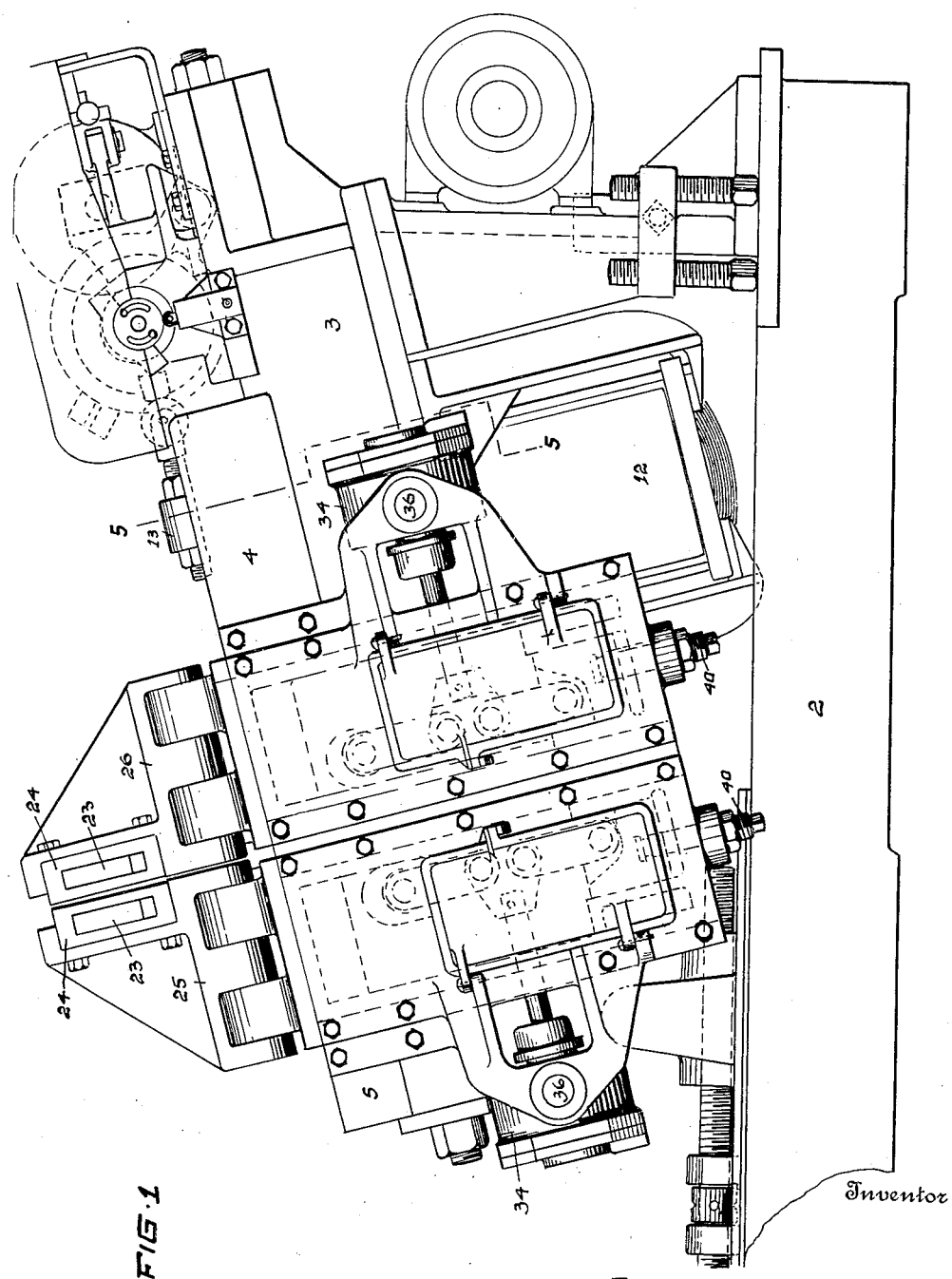
Figure 2:
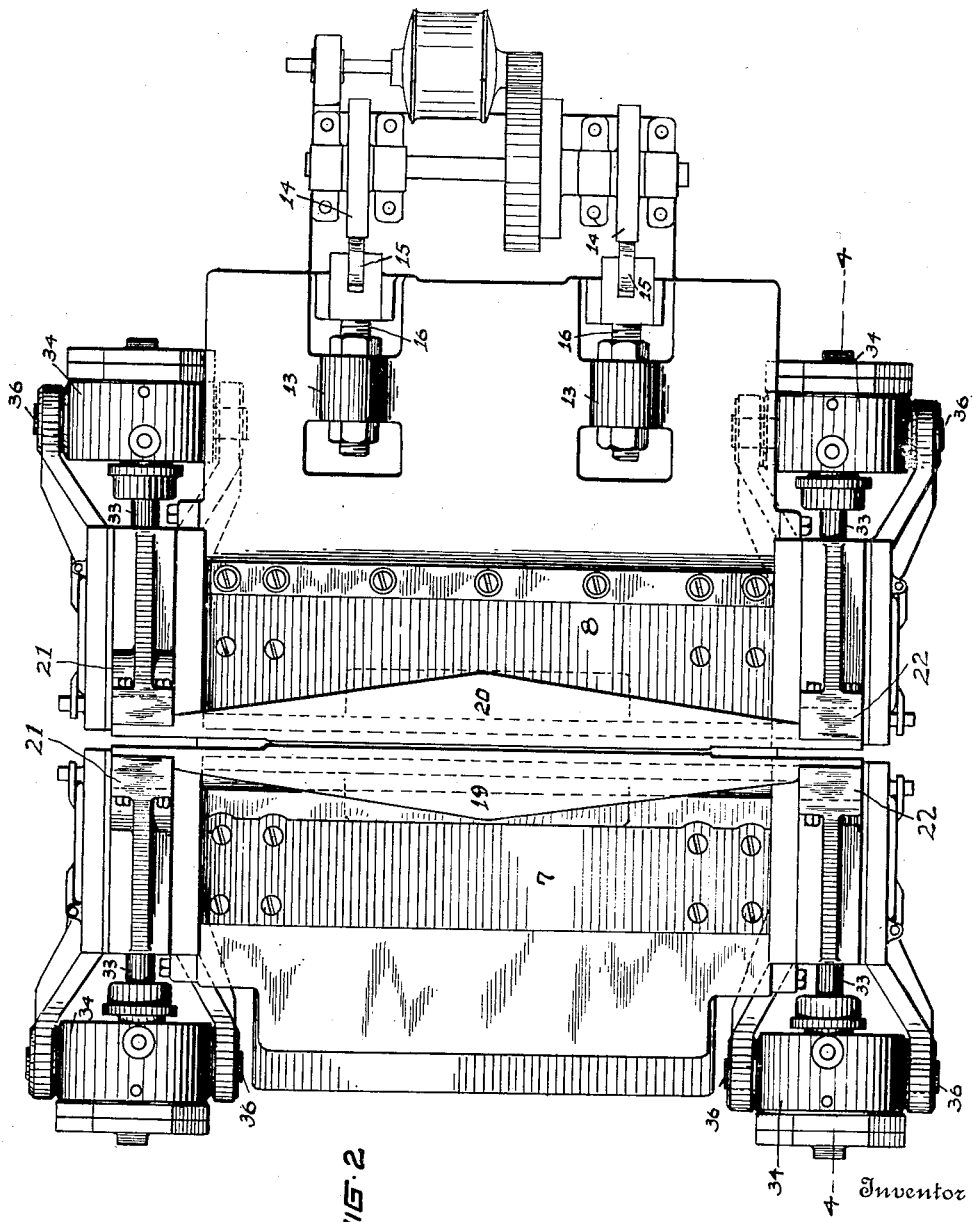
Figure 3:
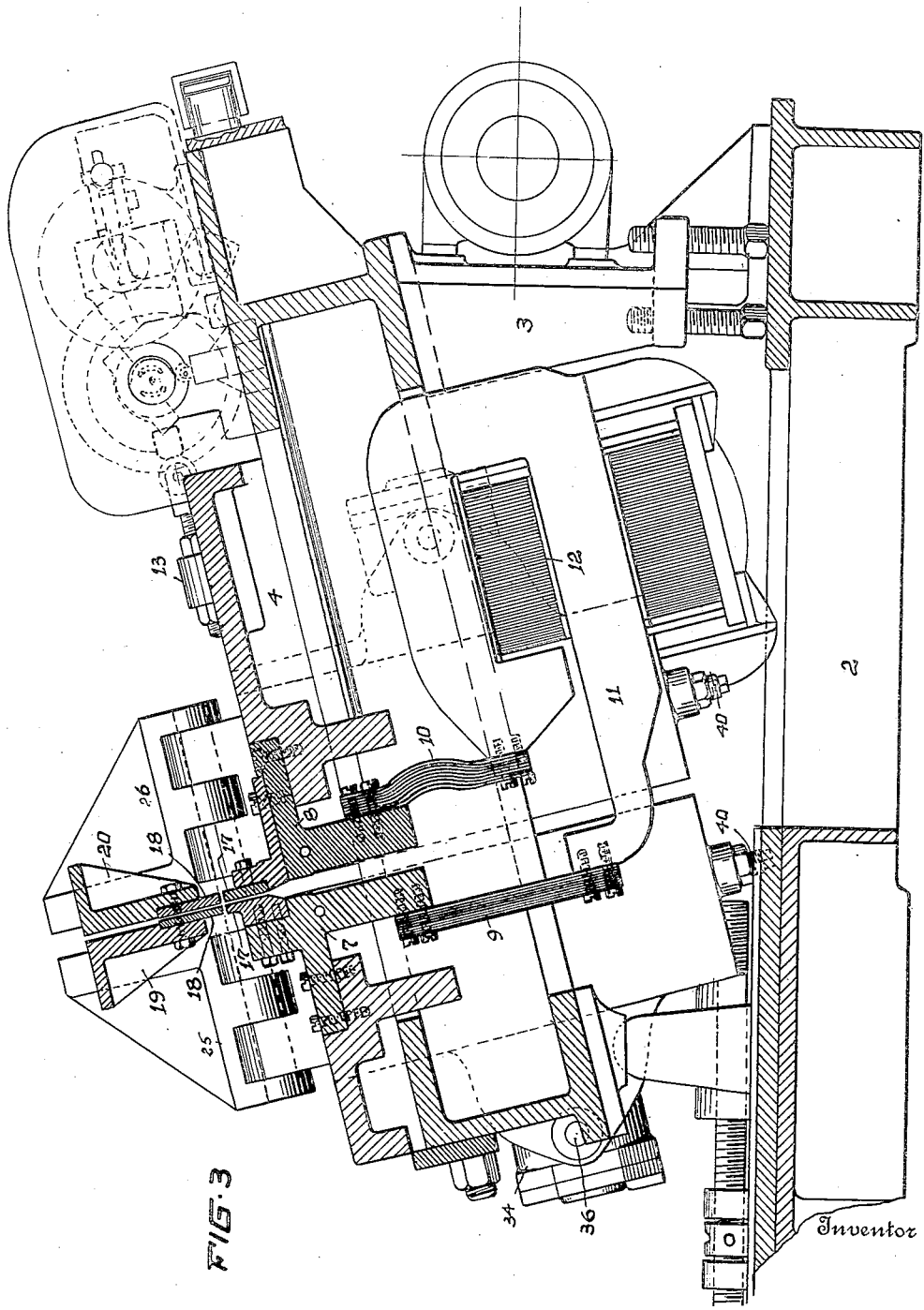
Figure 4:
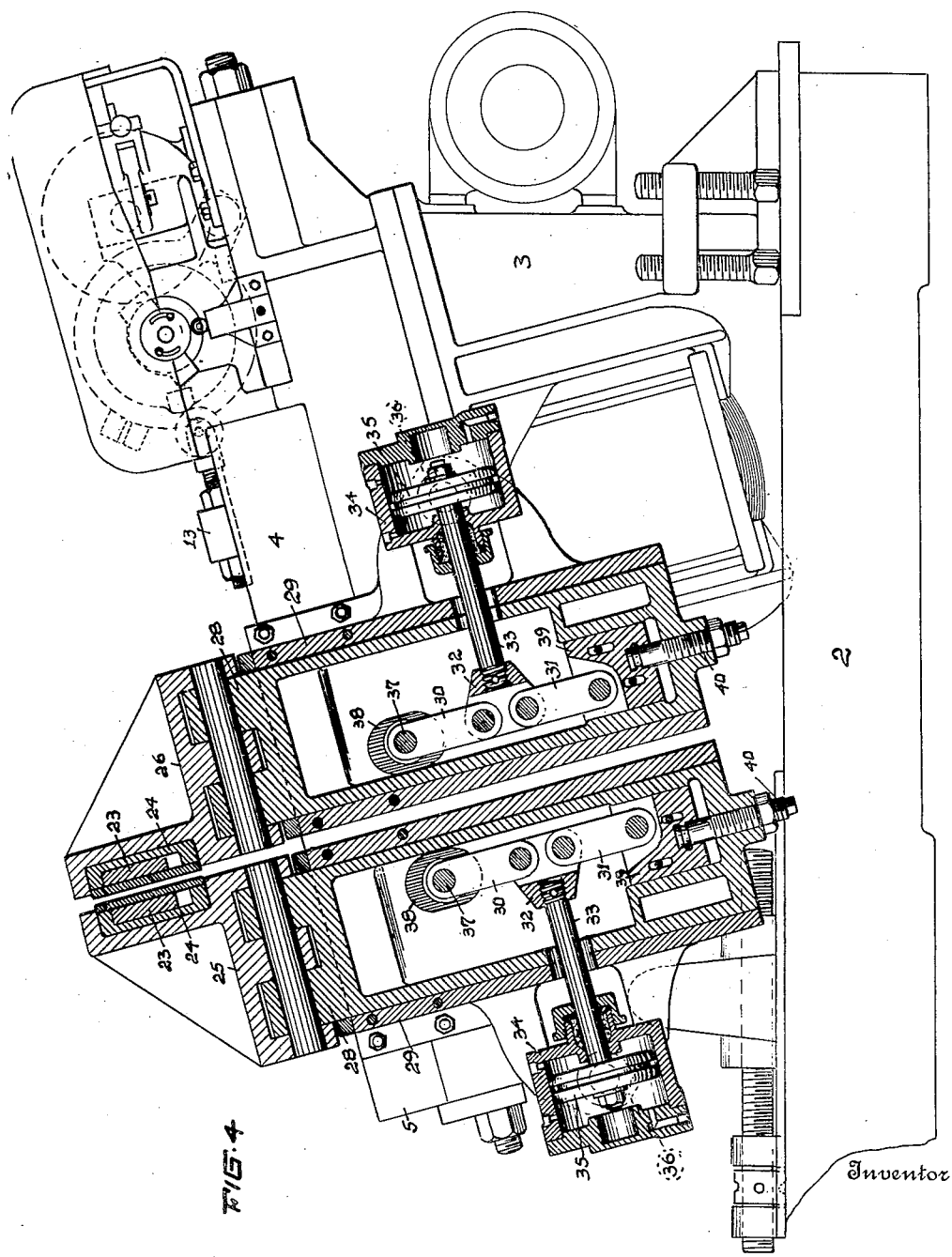
Figure 5:
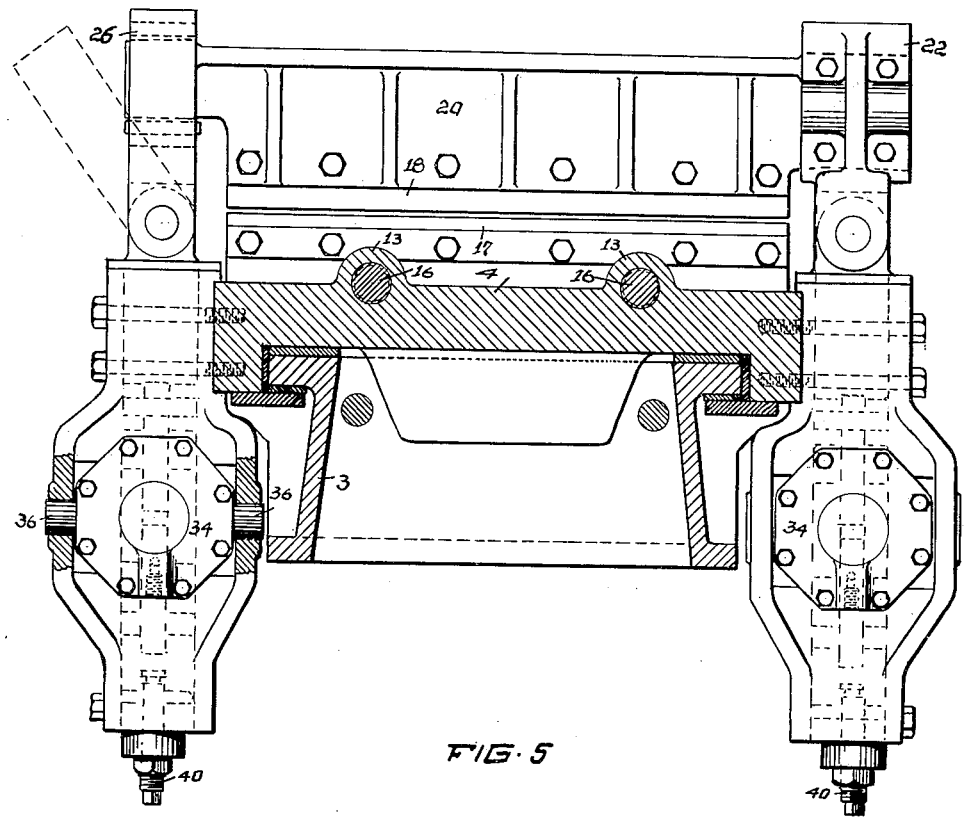

In the accompanying drawings, Fig. 1 is a side elevation of an electrical welding machine embodying the invention, and Fig. 2 a top view thereof. Fig. 3 is a longitudinal section, and Fig. 4 a side elevation and sectional view on line 4—4 of Fig. 2. Fig. 5 is a vertical section transversely of the upper part of the machine on line 5—5 of Fig. 1.

The working aggroupment or assembly of parts shown in the drawings represents one unit or section of a twin or double machine wherein two separate welding operations are produced simultaneously on several thin sheets of metal, that particular machine having been designed for welding two side members of an automobile body to an end member. However, to avoid duplication and prolixity only a part of this double machine is shown, the improvement being incorporated therein in its entirety. Thus, the main bed or base 2 of the machine carries a supplemental frame 3 which may be tilted and supported in a horizontally-inclined position. A movable table 4 is slidably supported on top of frame 3 opposite a stationary table 5, see Fig. 3. Frame 3 is of open rectangular construction, and the tables 4 and 5 are provided with heavy copper bars 7 and 8, respectively, of angular form, from which flexible laminated conductors 9 and 10 extend to the terminals of the secondary 11 of a welding transformer 12 located beneath frame 3. The movable slide or table 4 is shifted toward stationary table 5 by rotatable cams 14 which engage rollers 15 at the outer ends of two screws 16, the latter being secured to bosses 13 on table 4, see Fig. 2.

The mechanism for rotating the cams 14 is shown diagrammatically in Fig. 2 and no claim is made therefor in this application. Suffice to say that reciprocal movements are imparted to the table, say for example, as set forth in the Taylor patent herein identified.

Now reverting to the improvement itself, the angular bars 7 and 8 on tables 4 and 5, respectively, carry dies or clamping plates 17—17 situated beneath complementary dies or clamping plates 18 fixed to two flanged cross beams 19 and 20, see Figs. 2 and 3. These cross beams are bolted to separate hinge members 21 and 22, respectively, at one side of frame 3, while the opposite ends have reduced extensions 23—23 engaged by yoke members 24—24 which are bolted to a second set of hinge members 25 and 26, respectively, at the other side of the frame. By swinging the hinge members 25 or 26 outwardly on their pivots as indicated in dotted lines Fig. 5, the reduced extensions 23 of the beams may be released and the beams turned to an upright position to give free access to the dies and the work. When the cross beams are lowered to a horizontal position and fastened within yoke members 24, they may be raised or lowered at both ends simultaneously to separate the dies or to bring them into clamping engagement with the sheets of metal under treatment.

The means for raising and lowering the beams and dies therefor is duplicated at the corresponding ends of the beams at each side of the machine; therefore a description of one operating unit will serve for all.

Thus, each hinged member for each beam is supported or connected to a vertical slide 28 operating in a housing or guide 29 bolted either to movable table 4 or stationary table 5 as the case may be. The slides carried on opposite sides of movable table 4 are necessarily movable with the table, while the slides operating in the housings or guides fixed to stationary table 5 or to frame 3, are relatively fixed.

The mechanism for operating each vertical slide 28 consists of a pair of toggle links 30—31 attached to a coupling 32 on a reciprocable shaft 33 which extends through one head of a hollow cylinder 34 containing a piston 35 at the inner end of the shaft. Cylinder 34 is mounted on trunnions or pivot lugs 36 to permit it to turn, inasmuch as one toggle link 30 is pivotally connected to a cross pin 37 which is fixed to the walls of housing 29 and extends through a slot or opening 38 in the wall of slide 28, see Fig. 4. The second link 31 is pivotally connected to a slidable block 39 confined within the lower end of slide 28 and connected to it by an adjusting screw 40 which extends through the bottom of the slide where it may be reached and manipulated by a wrench or other tool. Accordingly slide 28 may be raised or lowered by screw 40, thereby imparting like setting movements to the cross beam and die carried by the slide. Each slide may be adjusted independently either to align the paired dies, to space them apart variably as the thickness of the stock demands, or to produce any desired clamping pressure.

Either compressed air, steam or other fluid may be supplied to the cylinders 34 separately to move the pistons therein either forward or back and to apply the clamping pressure in any desired degree as the operator may elect, the passage of the fluid to and from the cylinders being controlled by suitable fluid-controlling valves or devices not shown. Power so transmitted to the four slides and the two beams permits a heavy clamping pressure to be applied uniformly through the dies along the entire length of one edge of each large sheet of metal, the elastic welding current is distributed uniformly along the edge of each sheet, and the thin sheets are clamped in perfect alignment in the same plane so that flash and butt welding steps may progress automatically and rapidly as soon as the sheets are gripped by the clamping dies and electrodes.

What I claim, is:

1. In an electrical welding machine, a movable table, separate sets of dies, for clamping the work and conducting electric current thereto, said dies extending transversely of said table, separate sets of adjustable toggle devices mounted in slides at opposite sides of said table for operating said separate sets of dies, and separate cylinders and pistons for operating said toggle devices, said toggle devices including stationary blocks adjustably mounted in said slides.

2. In an electrical welding machine, a table carrying a die for clamping the work, a cross beam spanning said table carrying a companion clamping die, vertical guides at opposite sides of the table, slides operating in said guides, connections for said beam and slides, toggle links connecting the slides and beam, and power-transmitting means at opposite sides of the table for buckling said toggle links.

3. In an electrical welding machine, a table having guide housings depending therefrom at opposite sides thereof, vertically-movable slides confined within said guide housings, a cross beam hinged to one slide and detachably connected to the second slide on the opposite side of said table, companion dies mounted upon said beam and table for clamping the work and conducting an electric welding current thereto, toggle links connected adjustably to each slide and their respective housings, a piston operatively connected to the toggle links for each slide, and cylinders for said pistons, said cylinders being movably supported to accommodate buckling movements of said links.

4. An electrical welding machine, comprising movable and stationary tables, slides vertically arranged at opposite sides of said table, work clamping dies carried by said slides and tables, toggle devices each including a stationary member adjustably connected with its slide for adjusting the range of the toggle device, and means for actuating said toggle devices.

5. An electrical welding machine, comprising two horizontally-inclined tables, slides suspended vertically from opposite sides of said tables, cross beams hinged to said slides, co-operating dies for clamping the work and conducting electric current thereto secured to said beams and tables, and toggle means for operating each slide, including a fluid-operated piston.

6. An electrical welding machine, comprising a frame, a fixed table and a movable table mounted upon said frame, slides and guiding means for said slides extending downwardly from said tables at each side thereof, a pair of cross beams affixed to separate pairs of said slides, electro-current-conducting dies secured to said tables, companion clamping dies fixed to said beams, and fluid-operated toggle means mounted at opposite sides of said frame upon the table beneath the top plane thereof for operating said slides.

7. An electrical welding machine, comprising a base frame, a supplemental frame mounted in a horizontally-inclined position on said base frame, separate tables mounted upon said supplementary frame carrying current conductors and dies, means for shifting one table relatively to the other table, slides and supporting guides therefor carried by each table at opposite sides of said frame, cross beams connected to the upper ends of said slides, clamping dies carried by said beams, toggle links connecting said slides and their supports, and cylinders having pistons therein operatively connected to said links.

8. In an electrical welding machine, a table, a pair of slides vertically arranged at opposite sides of said table, a beam hinged at one end to one of said slides and yoked at its opposite end to the second slide, a support for each slide, a movable block and an adjusting screw connected to each slide support, separate sets of toggle links connected to said blocks and said supports, and separate cylinders containing power-transmitting pistons operatively connected to said links.

In testimony whereof I affix my signature.

RUSSELL T. TODD.